Patented Dec. 19, 1939

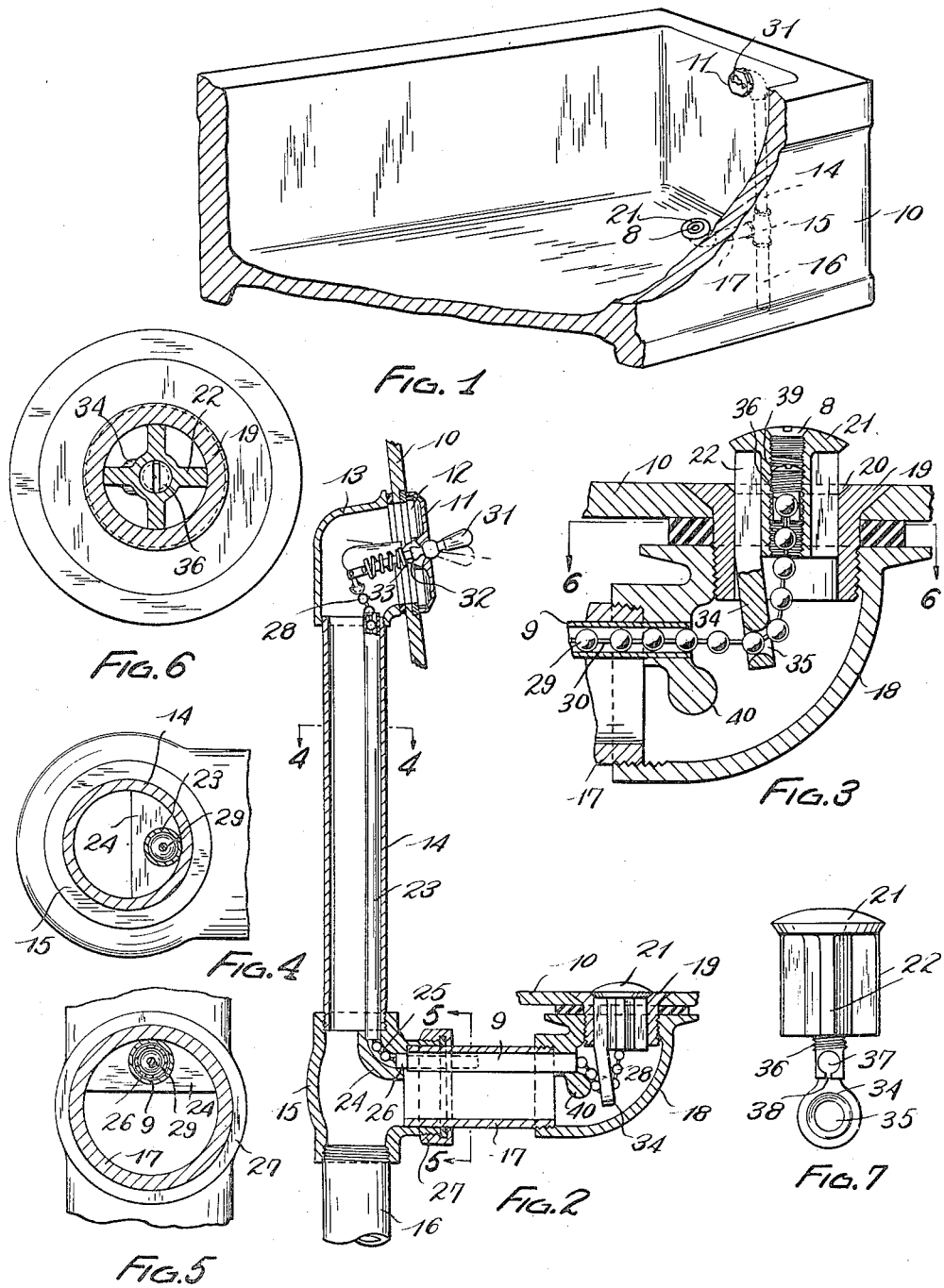

2,184,001

UNITED STATES PATENT OFFICE 2,184,001

WASTE CONTROL

Gunnar B. Nystrom, Cleveland Heights, Ohio, assignor to The Republic Brass Company, Cleveland, Ohio, a corporation of Ohio Application June 27, 1939, Serial No. 281,422

5 Claims. (Cl. 4—199)

This invention relates to improvements in waste controls and has to do particularly with pop-up waste stoppers for bathtubs, with a novel means for attaching the stopper to a pull cable by means of which the stopper is operated, and with means for adjusting the length of the cable at the stopper end.

One of the objects of the invention is the provision of means for readily threading an operating cable through the waste pipes and attaching it to the stopper.

Another object is the provision of means for quickly adjusting the length of the operating cable and the consequent height of the stopper in its open position.

Other objects and features of novelty will appear as I proceed with the description of that embodiment of the invention which, for the purposes of the present application, I have illustrated in the accompanying drawing, in which Fig. 1 is a fragmental perspective view of a bathtub illustrating one of the applications of the invention.

Fig. 2 is a central vertical sectional view showing the invention applied to the waste connections illustrated in Fig. 1, and with the stopper in closed position.

Fig. 3 is a fragmental vertical sectional view on a larger scale of a portion of the apparatus, showing the stopper in open position.

Figs. 4 and 5 are cross sectional detail views taken substantially on the lines 4—4 and 5—5 of Fig. 2, but on a larger scale.

Fig. 6 is a further cross sectional view taken substantially on the line 6—6 of Fig. 3.

Fig. 7 is a detail elevational view of the stopper with the threaded plug carried thereby in a lowered position ready to receive the ball end of an operating cable.

In the drawing a bathtub 10 is shown equipped with an upper waste plate 11 having waste passages 12 at its perimeter attached by screws or the like to an elbow 13 which in turn is connected with an upright waste pipe 14 that is joined by a T-union 15 with a waste pipe connection 16 and a horizontal section of pipe 17 extending from the T-union 15 to an elbow 18 that is clamped to the base of the tub by any suitable or conventional means comprising a hollow member 19 having a cylindrical inner wall and a bevel seat 20 for cooperation with the beveled edge on the head of the stopper 21. The stopper is provided with a plurality of ribs 22 which have a sliding fit within the member 19 in order to properly guide the stopper in its up and down movement.

In order to enable the plumber installing the apparatus to readily thread the operating cable through the pipes 14 and 17 I provide tubular connecting elements in those pipes, and these elements may conveniently include a small tube 23 in pipe 14 fixed in an internal boss 24 constituting part of the T-union 15, the boss 24 having a curved passage 25 therethrough to connect tube 23 with a shorter horizontal tube 26 also fixed in the said boss 24 and extending beyond the T-union. Another tube 9 slightly larger than tube 26 is fixed within the elbow 18 and telescopes with the tube 26 when the T-union 15, pipe section 17, and elbow 18 are assembled together. Thereafter a packing nut 27 mounted on the pipe 17 is screwed onto the union 15, thereby attaching the pipe 17 to the union and sealing the joint between them.

The operating cable 28 may be any suitable chain or cord formed of non-rusting metal or other suitable material. That illustrated herein consists of hollow spheres or balls 29 connected by pins 30 having up-set ends within the spheres, so that relative rotation and limited lengthwise movement are permitted. Cables of this sort are well known in the art.

When the plate 11 is removed one end of the cable may be inserted in the upper end of tube 23 and the cable readily threaded down through the tube 23, passage 25 and tubing 26 and 9 out into the elbow 18. The upper end of the cable is attached to some convenient actuator for exerting an upward pull. In the present instance this actuator takes the form of a lever 31 fulcrumed in the plate 11, the cable being attached to the inner end of this lever. The rear side of the plate 11 may carry a pair of spaced bosses 32 between which the lever swings and against which a spring-pressed washer 33 bears. When the outer end of the lever 31 is in its raised or full line position the washer 33 engages the bosses 32 beneath their high points so as to yieldingly hold the lever in that position. When the lever is swung to its other or dotted line position the washer 33 yields and passes over the high points of the bosses 32, engaging the bosses above those points and tending to hold the lever in the latter position.

In a depending portion of the stopper 21, in the present instance in a continuation 34 of one of the ribs 22, there is a substantially horizontal passage 35 through which the cable 28 is extended, this passage being at a height which is well below the tube 9 when the stopper is in closed position as illustrated in Fig. 2, and at least no higher than the tube 9 when the stopper is in the raised position. From the passage 35 the cable extends upwardly into connection with a threaded plug 36 which constitutes means for performing two functions, namely fastening the cable to the stopper and adjusting the effective length of the cable.

As shown in Fig. 7 the plug 36 has a lower extremity through which there is a transverse bore 37 slightly larger in diameter than the diameter of the balls 29. This bore is connected with the lower end surface of the plug by a slot 38 which is of a width much less than the diameter of the balls 29 but large enough to admit freely the smaller portions of the cable, that is the pins 30 in the embodiment illustrated. When the cable is to be connected with the stopper a threaded closure plug 8 is removed from the upper end of a threaded vertical opening 39 in the stopper and a screw-driver is caused to enter the opening from the upper end thereof and to engage the screw-driver socket in the upper end of the plug 36, after which it is turned to cause the plug to be threaded downwardly until it protrudes from the bottom of the stopper to about the extent illustrated in Fig. 7. The ball on the end of the cable and the pin connected with that ball are then caused to enter the bore 37 and the slot 38 from one side of the plug. The screw-driver is now turned in the opposite direction to retract the plug into the opening 39, thereby closing the ends of the bore 37 and preventing inadvertent separation of the cable from the stopper. Preparatory to making this connection between the cable and stopper the operator adjusts the lever 31 to the full line position of Fig. 2 so as to lower the cable as much as possible. Then, with the stopper in his hand, entirely above the hollow member 19, he connects the cable with the plug 36 as previously described, after which he drops the stopper into the member 19 permitting it to descend to closed position by gravity.

Now, in order to adjust the length of the cable so that the stopper will pop up to the desired elevation when the lever 31 is depressed, the workman proceeds while the lever 31 is in the lowered position to insert his screw-driver again into the opening 39 and to thread the plug 36 upwardly. The slack in the cable will then be taken up gradually and the stopper will rise to any desired extent up to the maximum height indicated in Fig. 3, that is with the passage 35 approximately in line with the tube 9. When this has been done and the closure plug 8 again screwed into place the apparatus will be ready for use. The stopper is raised and lowered by flipping the lever 31 downwardly or upwardly, it being noted that the mass of the stopper is sufficient to overcome any friction in the apparatus and to cause the stopper to close by gravity whenever the lever 31 is moved to its upper position. As a guide for the lower end of the cable when the stopper is moving from closed to open position the elbow 18 is preferably provided with a transverse bar 40 having a rounded surface.

Having thus described my invention, I claim:

1. In a pop-up waste control, a vertically movable stopper having a vertical threaded opening therethrough, a screw plug threadably mounted within said stopper opening, said plug having means at its lower extremity to receive sidewise an enlarged end of a flexible cable, and said plug having a tool socket in its upper face, whereby the plug may be withdrawn into the stopper opening and separation of the plug and flexible connection prevented.

2. In a pop-up waste control, a vertically movable stopper having a vertical threaded opening therethrough, a screw plug threadably mounted within the said stopper opening, said plug having a pocket near its lower extremity open to one side of the plug and having a slot connecting the pocket with the lower end surface of the plug whereby a flexible cable with an enlarged extremity may be inserted into the plug sidewise, and said plug having a tool socket in its upper face whereby the plug may be threaded upwardly into the stopper opening sufficiently to close said pocket and prevent the separation of the flexible cable from the plug.

3. In a pop-up waste control, a vertically movable stopper having a vertical threaded opening therethrough, a screw plug threadably mounted within the said stopper opening, the lower end of said plug having a bore extending transversely therethrough and having a slot intersecting the axis of said bore and the axis of the plug and connecting the bore with the end surface of the plug, said bore and slot being adapted to receive sidewise a flexible cable having a ball on its extremity of a diameter less than the diameter of said bore and greater than the width of said slot, and means for turning said plug whereby the plug may be threaded upwardly into the stopper opening to close the ends of said bore and to adjust the position of said ball lengthwise of the stopper.

4. In an overflow for a bathtub, two pipes arranged at right angles to each other, a union connecting said pipes, threadably joined to one of them, means providing a small tubular passage through said last named pipe and through said union and comprising a small tubular element projecting from said union, a small tubular element in the second pipe telescoping with said projecting tubular element, and means for sealing the joint between said second pipe and said union.

5. In apparatus of the class described, a pop-up waste stopper, an operating cable therefor, and means for adjusting the effective length of the cable comprising a plug threaded into a lengthwise opening in the stopper, an end of said cable being attached to the inner end of said plug, said plug having a tool socket in its outer end whereby a tool may be inserted through the opening of the stopper into engagement with said socket after the parts are assembled for threading said plug inwardly or outwardly.

GUNNAR B. NYSTROM.